United States Patent [19]

Kuo

[11] Patent Number: 4,596,923
[45] Date of Patent: Jun. 24, 1986

[54] CALCULATOR HOUSING

[75] Inventor: Calven Kuo, Taipei, Taiwan

[73] Assignee: Aurora Mechatronics Corp., Taipei, Taiwan

[21] Appl. No.: 795,677

[22] Filed: Nov. 6, 1985

[51] Int. Cl.⁴ .............................................. G06C 5/02
[52] U.S. Cl. .................................... 235/1 D; 312/201
[58] Field of Search .......................... 235/1 D, 145 R; 312/201, 327

[56] References Cited

U.S. PATENT DOCUMENTS 4,259,568  3/1981  Dynesen .............................. 235/1 D
4,280,034  7/1981  Ezaki et al. ......................... 235/1 D

*Primary Examiner*—Benjamin R. Fuller
*Attorney, Agent, or Firm*—Townsend and Townsend

[57] ABSTRACT

The present invention relates to an improved calculator housing which includes a number-entry key housing having two lugs extending longitudinally from its upper ends, each with a first annular boss projecting inwardly from the lugs; a display housing having a hollow cylindrical extension portion with a circular protrusion at one of its end and a second boss at the other end, which extends between the lugs of the number-entry key housing; both the circular protrusion and the second annular boss being movably inserted into the first annular bosses, and means for interengaging the first and second annular bosses to limit the movement of the second annular boss relative to the second annular boss so that the display housing can be folded relative to the number-entry key housing adjusted and fixed in a suitable position according to the user's need, for seeing the display clearly and comfortably in practical use.

5 Claims, 2 Drawing Figures

CALCULATOR HOUSING

BACKGROUND OF THE INVENTION

The present invention relates to an improved calculator housing, particularly concerning a foldable calculator providing a display housing pivotally engaged with a number-entry key housing so that the display housing can be folded and adjusted in any desired position and fixed there for convenience in practical use.

Various types of calculators are widely used, such as pocket calculators, desk calculators etc. Generally, the design of prior art of calculators has the following disadvantages:

(1) The direction of light falling on the display may change during the day time according to various circumstances, so that the user may be unable to see the display clearly since the displays are made of liquid crystal. This will make his eyes feel uncomfortable.

(2) Some calculators are designed with a rigid housing with the display portion at a fixed angle to the entry key housing. These calculators take comparatively greater space in transportation, entailing high costs, and are inconvenient for storing in large numbers.

(3) Some prior designs of rigid housing have the disadvantage in manufacturing that the display portion and the number-entry key portion have to produced separately and combined together with a bolt so that more elements are needed and the production cost is increased. Also, such calculators are easily damaged or broken in practical use.

To the applicant's knowledge, at present, there is no calculator providing an engaging device for the display and the number-entry key portions such that the display can be folded, adjusted, and fixed in any desired position according to the user's need in practical use.

SUMMARY OF THE INVENTION

With the above disadvantages in mind, the general object of the invention is to provide an improved calculator which is simple in construction and convenient in practical use.

An object of the invention is to provide an improved calculator which provides an arrangement of elements in which the display housing can be pivotally engaged with the number-entry key housing so that the display housing can be folded, adjusted, and fixed in any position according to the user's need, for seeing the display clearly relative to any light source directed to it.

Another object of the invention is to provide an improved calculator which can help save space, and thus reduce the cost of transportation since the display housing can be folded.

In order to achieve the aforesaid objects as well as other incidental objects and advantages, the invention includes a first broad housing for a number-entry key portion, having two first opposing broad walls, and two first opposing narrow walls interconnecting two pair of sides of the first broad walls. Each of the first narrow walls has a lug extending longitudinally from its upper ends and a first annular boss projecting inwardly from the lugs. The number-entry keys are disposed on the upper surface of one of the two first opposing broad walls.

The invention further includes a second broad housing for a display portion, having two second opposing broad walls, and two second opposing narrow walls interconnecting two pair of sides of the second broad walls, and a cylindrical extension portion of smaller width than the broad sides of said second broad housing extending from the lower broad sides, the cylindrical extension portion having a circular protrusion at one end and a second annular boss projecting outwardly from its other end. The cylindrical extension portion extending between the lugs of the first housing and the circular protrusion and the second annular boss is movably inserted into the first annular bosses.

A circular piece is rotatably received in the second annular boss and is fixed to one of the lugs by a screw for interengaging the first and second annular bosses. The circular piece has a cross-shaped recess opening at one of its circular end face, and a T-shaped pawl piece and a spring received in the cross-shaped recess. The spring biases the pawl piece in a radial direction and a plurality of recesses are provided on the inner periphery of the second annular boss for engaging with the pawl piece so that the movement of the second annular boss is limited relative to the first annular boss and the display housing can be fixed in a desired position. The circular piece further has an annular flange at the ends opposite to the circular end face, and the second annular boss has an annular groove for receiving the annular flange so that the circular piece can be secured in the second annular boss.

The invention also has a hollow flexible cover provided around the extension portion wherein the hollow flexible cover includes two rectangular open end each of which has an inwardly bent marginal portion along each broad side. The number-entry key housing further includes two first grooves on the outer surface of the first broad walls adjacent to the lugs along the two broad sides, and the display housing further includes two second grooves on its outer surface adjacent to the cylindrical extension portion along its second broad sides so that the inwardly bent marginal portion can be received in the first and the second groove to connect the number entry keys housing and the display housing with the hollow flexible cover.

BRIEF DESCRIPTION OF THE DRAWINGS

These and other advantages, objects and features of the present invention will become apparent from the following detailed description of the preferred embodiment with reference to the accompanying drawings, wherein.

DETAILED DESCRIPTION OF THE PREFERRED EMBODIMENT

The following is a detailed description of the best presently contemplated embodiment of the invention. This description is not to be taken in a limiting sense, but is made merely for the purpose of illustrating the general principles of the invention.

Figure 1:
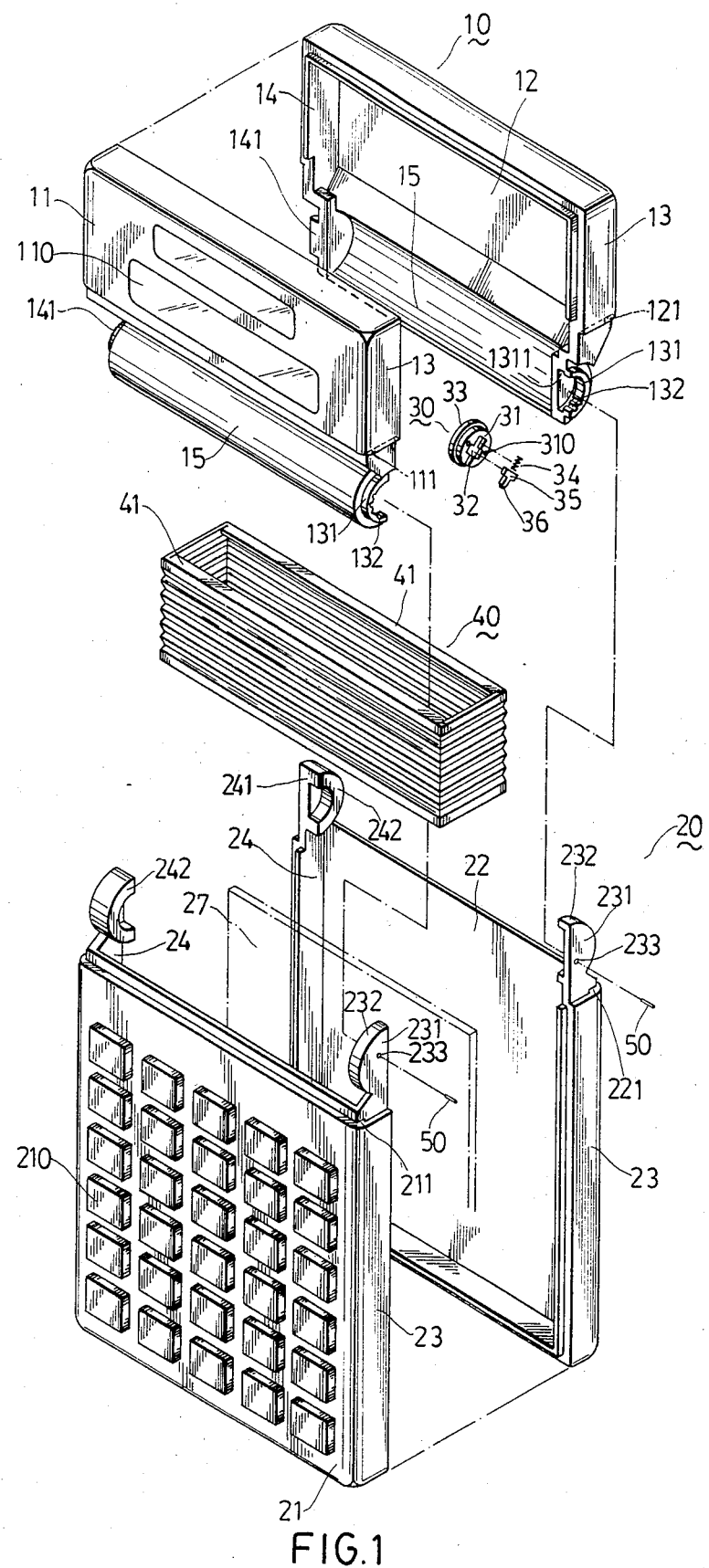
FIG. 1 is an exploded view of the invention.
Figure 2:
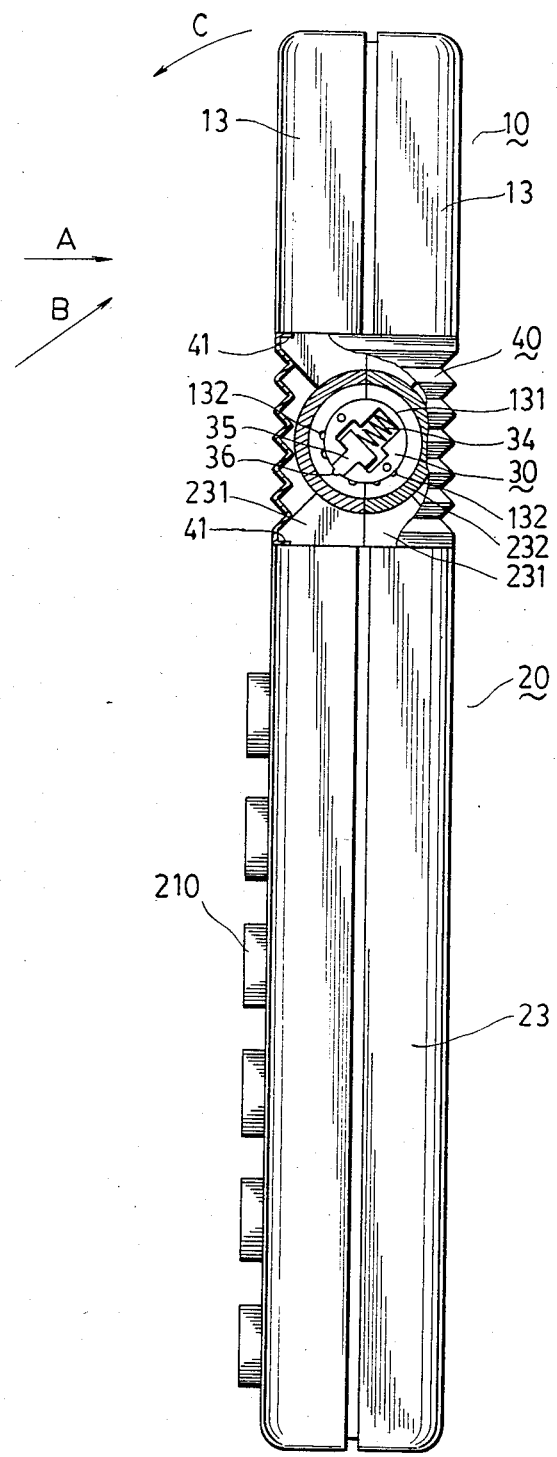
FIG. 2 is a side view and a partial view of the invention showing the interengaging portion of the display housing and the number-entry key housing, through which the display housing can be folded relative to the number-entry key housing.

Referring to FIG. 1 and FIG. 2, the invention includes a first broad housing 20 for a number-entry key portion having two first opposing broad walls 21, 22, two first opposing narrow walls 23, 24 interconnecting two pair of sides of the first broad walls 21, 22. Each of the first narrow walls 23, 24 has a lug 231, 241 extending longitudinally from its upper ends and a first annular boss 232, 242 projecting inwardly from the lugs 231, 241. The number-entry keys 210 are disposed on the upper surface of the first broad walls 21. The number-entry keys housing further includes two first grooves 211, 221 on the outer surface of the broad wall 21, 22 adjacent to the lugs 231, 241 along the two broad sides. A circuit board 27 for the calculator can be stored in the first housing 20.

The invention further includes a second broad housing 10 for a display portion having two second opposing broad walls 11, 12, two second opposing narrow walls 13, 14 interconnecting two pair of sides of the second broad walls 11, 12 and a cylindrical extension portion 15 of smaller width than the broad side of the second broad housing 10 extending from the lower second broad sides of the two second broad walls 11, 12. The cylindrical extension portion 15 has a circular protrusion 141 projecting from one of its ends and a second annular boss 131 projecting from its other end. The cylindrical extension portion 15 extends between the lugs 231, 241 of the first housing 20, wherein the second annular boss 131 and the circular protrusion 141 of the cylindrical extension portion 15 are received respectively in the first annular bosses 232, 242 of the lugs 131, 141 so that the second annular boss 131, and the circular protrusion 141 can be movably inserted into the first annular bosses 232, 242. A display 110 is on the outer surface of the broad wall 11. The display housing 10 further includes two second grooves 111, 121 on its outer surface adjacent to the cylindrical extension portion along the broad sides of the second broad walls 11, 12.

A circular piece 30 is rotatably received in the second annular boss 131 and is fixed to the lug 231 by two screws 50 through two screw holes 233 of the lugs 231 and two screw holes 310 of the circular piece 30 for interengaging the first and second annular bosses 232, 131. The circular piece 30 has a cross-shaped recess 32 opening at one of circular end face 31 and a T-shaped pawl piece 35 and a spring 34 received in the cross-shaped recess 32. The spring biases the pawl piece 35 in a radial direction and a plurality of recesses 132 provided on the inner periphery of the second annular boss 131 for engaging with the top point 36 of the pawl piece 35 so that the movement of the second annular boss 131 is limited relative to the first annular boss 232 and also the display housing 10 can be fixed in a desired position. The circular piece 30 further has an annular flange 33 at one of its ends opposite to the circular end face 31, and the second annular boss 131 has an annular groove 1311 for receiving the annular flange 33 so that the circular piece 30 can be secured in the second annular boss 131.

The invention still further has a hollow flexible cover 40 provided around the extension portion 15 wherein the hollow flexible cover 40 includes two rectangular open end each of which has an inwardly bent marginal portion 41 along each broad side, each of which marginal portions 41 can be respectively received in the first groove 211, 221 and the second groove 111, 121 so that the hollow flexible cover 40 can be connected to the first and second housings 20, 10.

By the above-described interengaging arrangement, the display housing 10 can be folded relative to the number-entry key housing 20 and adjusted to the proper position. As shown in FIG. 2, if the light source to the display 110 changes from direction A to direction B, the user can adjust the display housing 10 to a proper position along the arrow direction C according to the user's desire for seeing the display clearly and comfortably in practical use.

While this invention has been described with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures.

I claim:

1. An improved calculator housing comprising:
a first broad housing having two first opposing broad walls, two first opposing narrow walls interconnecting two pair of sides of said first broad walls, each of said narrow walls having a lug extending longitudinally from its upper ends, and a first annular boss projecting inwardly from said lug;
a second broad housing having two second opposing broad walls, two second opposing narrow walls interconnecting two pair of sides of the second broad walls and a cylindrical extension portion of smaller width than the broad side of said second broad housing extending from the lower ends of said second broad walls; said extension portion having a circular protrusion at one of its end and a second annular boss projecting outwardly from its other end, said extension portion extending between said lugs of said first housing and said circular protrusion and said second annular boss being movably inserted into said first annular bosses;
means for interengaging said first and second annular bosses to limit the movement of said second annular boss relative to one of said first annular bosses; and
a hollow flexible cover provided around said extension portion and connected to said first and second housings.

2. An improved calculator housing as claimed in claim 1, wherein said interengaging means includes a circular piece rotatably received in said second annular boss and fixed to one of said lugs, said circular piece having a cross-shaped recess opening at one of its circular end face and a T-shaped pawl piece and a spring received in said recess, said spring biassing said pawl piece in a radial direction; and a plurality of recesses provided on the inner periphery of said second annular boss for engaging with said pawl piece.

3. An improved calculator housing as claimed in claim 1, in which said circular piece has an annular flange at one of its ends opposite to said end face, wherein said second annular boss has an annular groove for receiving said annular flange.

4. An improved calculator housing as claimed in claim 1, wherein said first broad housing further includes two first grooves on the outer surface of said first broad walls adjacent to the lugs along said two broad sides, and said second broad housing includes two second grooves on its outer surface adjacent to said cylindrical extension portion along its broad sides of said second broad walls.

5. An improved calculator housing as claimed in claim 4, wherein said hollow flexible cover includes two rectangular open ends each of which has an inwardly bent marginal portion along each of its broad sides which can be received in said first grooves and said second grooves.

* * * * *